Oct. 15, 1963 T. O. WENTWORTH ET AL 3,107,149
METHOD OF SEPARATING AMMONIA FROM CARBON DIOXIDE
Filed May 12, 1961
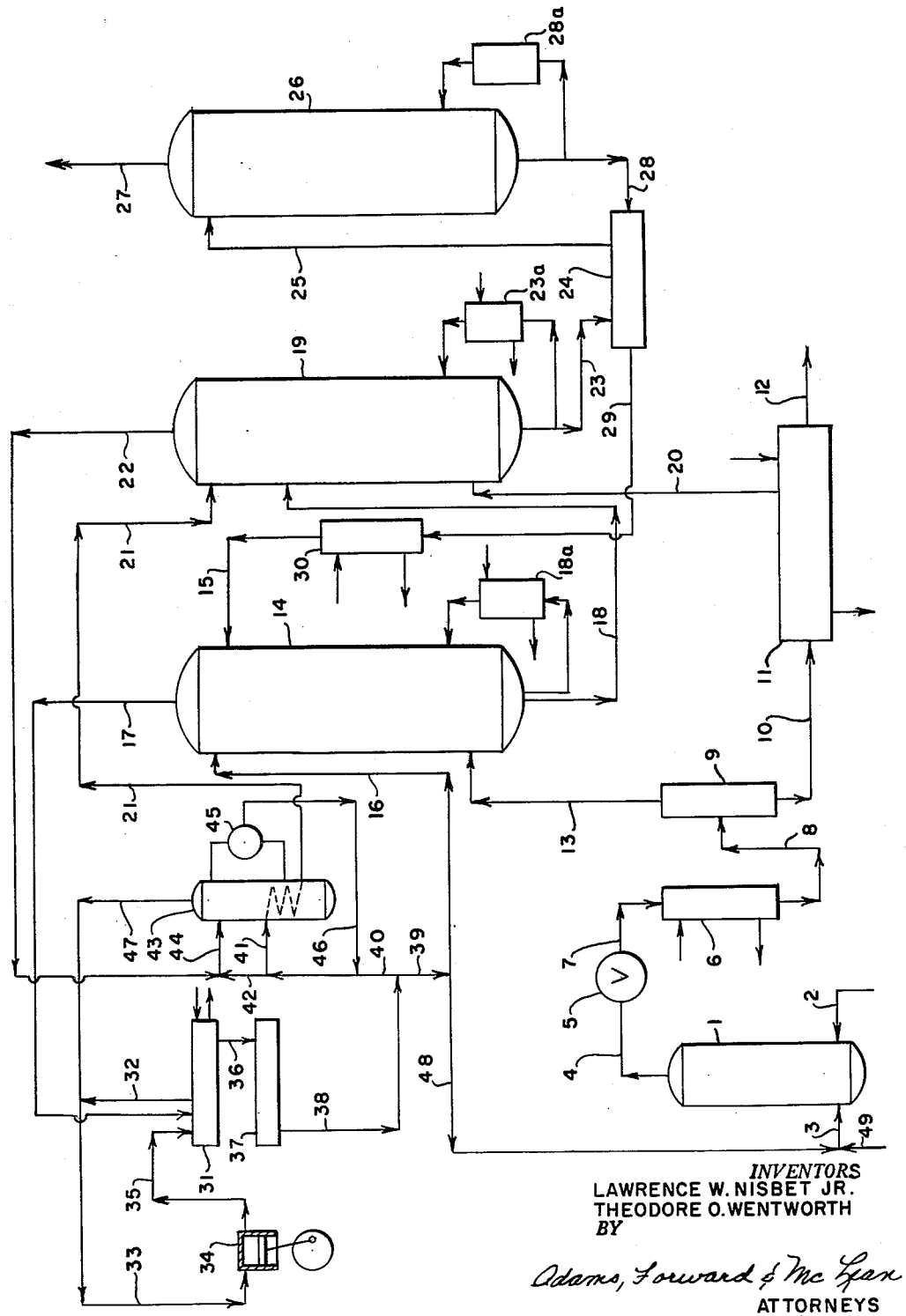
INVENTORS
LAWRENCE W. NISBET JR.
THEODORE O. WENTWORTH
BY
Adams, Forward & McLean
ATTORNEYS United States Patent Office 3,107,149
Patented Oct. 15, 1963

3,107,149
METHOD OF SEPARATING AMMONIA FROM CARBON DIOXIDE
Theodore O. Wentworth, Cincinnati, and Lawrence W. Nisbet, Jr., Loveland, Ohio, assignors, by mesne assignments, to Chemical Processes of Ohio Inc., a corporation of Ohio
Filed May 12, 1961, Ser. No. 109,719
14 Claims. (Cl. 23—196)

This invention relates to a method of treating gaseous mixtures containing ammonia and carbon dioxide for the separation and recovery of ammonia and/or carbon dioxide therefrom.

Mixtures of ammonia and carbon dioxide, particularly such mixtures together with significant quantities of water vapor, are common off-gas streams in some commercial urea-synthesis processes. Note the article by W. H. Tonn, Jr. in "Chemical Engineering," October, 1955, pages 186–190. Thus, for example, in the Inventa process for the production of urea, described in detail by Bland in "Petroleum Processing," volume 7, (1952) starting at page 1457, carbon dioxide and ammonia are reacted in an autoclave at elevated conditions of temperature and pressure yielding a product stream containing urea, ammonium carbamate, carbon dioxide, ammonia and water. Generally the conversion of carbamate to urea is in the range of about 40 to 80 percent per pass depending on the temperature, pressure and excess ammonia employed. After leaving the autoclave the pressure on the product stream is reduced to below about 20 atmospheres and the stream is heated to effect the dissociation of ammonium carbamate to carbon dioxide and ammonia. A gaseous mixture at a relatively high pressure containing carbon dioxide, water vapor and a high concentration of ammonia is then separated from the product stream and, upon removal and further heating of the remaining product stream, dissolved ammonia and carbon dioxide are driven off together with water, producing a second gaseous mixture at a lower pressure containing ammonia, carbon dioxide and water vapor in which ammonia and carbon dioxide constituents are still present in a significant quantity.

Due to the fact that an initial excess of ammonia is employed and also to the fact that the conversion of carbamate to urea is incomplete, the recovery and recycle of the unreacted materials, particularly the ammonia, is necessary to make the operation economically feasible.

The removal of carbon dioxide from gaseous mixtures also containing ammonia, such as off-gas streams from urea-synthesis processes, by absorption with weak bases such as sodium carbonate, potassium carbonate and water-soluble amines, particularly water-soluble alkylolamines such as, mono-, di-, and tri-ethanolamine, propanolamine, and the like, has previously been suggested, for example, in United States Patent 2,785,045 issued to Wan et al. on March 12, 1957. Where an ammonia and carbon dioxide off-gas stream at relatively high pressures is available, it is desirable to operate the alkylolamine absorber at similar high pressures so that the ammonia gas effluent is condensable with cooling water and without compression and in such a manner that as much ammonia as possible is separated from the off-gas stream in the absorber. To maximize ammonia separation in the absorber, the concentration of alkylolamine in the absorbing liquid must be maintained at a high level, the concentration of water in the absorbing liquid must be maintained at a low level, and the bottoms temperature in the absorber should be maintained at as high a level as is feasible without causing undue alkylolamine degradation. The absorption of carbon dioxide by an alkylolamine, however, evolves heat and it is necessary to control the bottoms temperature of the absorber to prevent excessive degradation of the relatively expensive alkylolamine. Conventional means for controlling the bottoms temperature are by the provision of cooling coils and/or dilution of the alkylolamine with water.

The present invention provides a unique processing sequence for maximizing the proportion of the ammonia which can be separated from a relatively high pressure off-gas stream containing ammonia and carbon dioxide under conditions permitting condensation of the ammonia with cooling water and without compression. This is accomplished, according to the present invention, by maintaining the absorber pressure within the range of about 70 p.s.i.a. to about 280 p.s.i.a., maintaining the alkylolamine concentration in the absorbent entering the absorber at at least about 50% by weight and introducing liquid ammonia into the top of the absorber in an amount sufficient to maintain the absorber bottoms temperature at the maximum level at a given absorber pressure for a given alkylolamine precluding excessive alkylolamine degradation which would otherwise occur. Generally, for monoethanolamine, the absorber bottoms temperature will be within the range of about 220 to 320° F. and the ammonia concentration in the bottoms effluent will be within the range of approximately 3–20% by weight.

The enriched alkylolamine effluent from the absorber is then passed to an ammonia stripper operated at lower pressures within the range of about 15 to 50 p.s.i.a. wherein the ammonia content of the absorbent from the absorber is liberated. The bottoms temperature in the ammonia stripper again is maintained at an acceptable level at a given pressure for a given alkylolamine, i.e. a bottoms temperature within the range of about 300° to 360° F. for monoethanolamine, depending upon the water content of the alkylolamine.

Thus, in accordance with the present invention, a gaseous mixture containing at least one mole of ammonia per mole of carbon dioxide at a pressure within the range of about 70 p.s.i.a. to about 280 p.s.i.a. is contacted with a liquid alkylolamine of at least 50 percent by weight concentration (the balance present being largely water) in a first contact stage wherein all the carbon dioxide is absorbed by the alkylolamine and sufficient liquid ammonia is introduced into the upper portion of the first contact stage to maintain the bottoms alkylolamine temperature at the maximum level precluding excessive alkylolamine degradation which would otherwise occur, the unabsorbed ammonia being removed from the first contact stage. The alkylolamine enriched with carbon dioxide and ammonia is removed from the first contact stage and passed to a second contact stage maintained at a pressure within the range of about 15 to 50 p.s.i.a. In the second contact stage ammonia is desorbed from the enriched alkylolamine, the ammonia gas being removed from the second stage. The alklolamine enriched with carbon dioxide is removed from the second contact stage and passed to a third stage wherein it is heated thereby liberating absorbed carbon dioxide, the liberated carbon dioxide being withdrawn from the third stage. The liquid alkylolamine substantially free of dissolved ammonia and carbon dioxide is then removed from the third stage.

Advantageously, the second contact stage is operated as a combination absorber-stripper and a second stream of a gaseous mixture containing ammonia and carbon dioxide is also passed into the second contact stage wherein the carbon dioxide is absorbed from the second stream.

While the molar ratio of ammonia to carbon dioxide in both of the streams can vary anywhere from about 95:1 to about 1:1, it is preferred that the molar ratio of ammonia to carbon dioxide in the first stream be about 20:1 to about 2:1 and where the second contact stage is operated as a combination absorber-stripper, that the molar ratio in the second stream be about 20:1 to about 1:1, preferably about 10:1 to about 1:1. Both the first and second stream can contain water vapor up to saturation. It is preferred, however, that the molar ratio of water to the total moles of ammonia and carbon dioxide in the first stream does not exceed about 0.25:1 and that the molar ratio of water to the total moles of ammonia and carbon dioxide in the second stream does not exceed about 2:1.

The alkylolamines suitable for employment in the method of this invention include mono-, di-, and triethanolamine, propanolamine and the like. It has been found to be particularly advantageous to employ monoethanolamine in the method of this invention.

From the brief explanation of the urea-synthesis process given above, it can be seen that the proportion of the off-gases introduced into the first contact stage is usually much greater than that introduced into the second contact stage. Thus, the weight ratio of the first stream to the second stream is generally in the range from about 30:1 to about 3:1.

The operating conditions employed in each of the stages of this invention can vary considerably with upper and lower limits dictated by practical considerations that will be obvious to those skilled in the art. Thus, for example, the liquid alkylolamine introduced into the first stage is that which has been regenerated in the third stage and it can be introduced into the first stage at a temperature of about 50° F. to about 140° F. The amount of liquid ammonia introduced into the first contact stage will then depend largely on the temperature of the entering gaseous mixture, the temperature of the entering alkylolamine, the water content of the bottoms alkylolamine and also on the amount of indirect positive cooling used in the stage.

The second contact stage is operated under conditions ensuring maximum ammonia removal. Thus, the enriched alkylolamine from the first contact stage is introduced directly through a pressure let-down valve into the second stage and the ammonia flashed off. A reboiler is advantageously provided to ensure a high bottoms temperature and complete ammonia evolution. The amount of positive heating required is determined by the temperature and pressure of the enriched alkylolamine from the first contact stage and whether the second contact stage is operated as a combination absorber-stripper, in the latter event, heat also being supplied by the absorption of carbon dioxide by the alkylolamine. Liquid ammonia can be introduced into the top of the second contact stage to ensure complete separation of the effluent ammonia from water and to prevent alkylolamine entrainment.

The temperature in the third stage wherein the enriched alkylolamine is heated to liberate absorbed carbon dioxide and water vapor can be varied within the range of about 220° F. up to the temperature at which excessive degradation of the alkylolamine takes place, i.e. about 300° to 370° F. in the case of monoethanolamine at essentially atmospheric pressure. Similarly, the third contact stage, wherein the alkylolamine is regenerated, can be operated at somewhat elevated pressures.

The process of this invention is illustrated in detail by the following example taken in connection with the accompanying drawing.

Example 1

Referring to the accompanying drawing, high purity carbon dioxide is introduced into reactor 1 by means of line 2 and liquid ammonia in substantial excess over the stoichiometric quantity is pumped in through line 3. The reactor operates under about 200 atmospheres pressure at about 170°–190° C. The conversion to urea based upon carbon dioxide introduced to the reactor is about 67 percent per pass. The product stream flows from reactor 1 by way of line 4 through pressure let-down valve 5 which reduces the pressure to about 20 atmospheres and then into the steam-heated primary exchanger 6 by way of line 7. In exchanger 6, under the reduced pressure, the carbamate dissociates into carbon dioxide and ammonia. The product stream leaves exchanger 6 by way of line 8 and enters separator 9 where the gases are flashed off and residual carbamate is decomposed. From the separator 9, the crude urea stream is passed by way of line 10 to steam heated concentrator 11 where the remaining gases are removed together with part of the water formed during the reaction. The crude urea solution is withdrawn from concentrator 11 by way of line 12 and subjected to further processing (not shown) such as prilling or purification by crystallization from water.

Overhead from separator 9 there is withdrawn by way of line 13 and passed to the lower portion of high pressure absorber 14 a gas stream at a temperature of 240° to 260° F. and a pressure of 214 p.s.i.a. composed of 13,540 pounds per hour of ammonia; 3,840 pounds per hour of carbon dioxide and 390 pounds per hour of water vapor. In absorber 14 the gases entering through line 13 are contacted countercurrently with a liquid stream composed of 27,300 pounds per hour of monoethanolamine, 130 pounds per hour of water and 100 pounds per hour of carbon dioxide entering the upper portion of absorber 14 by way of line 15. Also there is introduced at the top of absorber 14 by way of line 16 a stream of 3110 pounds per hour of liquid ammonia at 95° F. and withdrawn overhead from absorber 14 by way of line 17 at a temperature of 100° F. and 211.7 p.s.i.a. are 13,540 pounds per hour of ammonia.

From absorber 14 a bottoms stream amounting to 11,820 pounds per hour at a temperature of 275° F. is continuously withdrawn and passed through exchanger 18a in indirect heat exchange with 58 gallons per minute of cooling water at 85° F. whereby the temperature of the bottoms stream is lowered to 160° F. prior to return to absorber 14.

Withdrawn as bottoms from absorber 14 by way of line 18 and passed to the upper portion of low pressure absorber 19 is a stream at a temperature of 275° F. composed of 27,300 pounds per hour of monoethanolamine, 520 pounds per hour of water, 3110 pounds per hour of ammonia, and 3940 pounds per hour of carbon dioxide. Entering the lower portion of absorber 19 by way of line 20 from concentrator 11 at a temperature of 270° to 300° F. and a pressure of 35 p.s.i.a. is a stream containing 520 pounds per hour of ammonia, 680 pounds per hour of carbon dioxide and 1120 pounds per hour of water vapor. Also there is introduced at the top of absorber 19 by way of line 21 a stream of 1600 pounds per hour of liquid ammonia at 80° F. and withdrawn overhead from absorber 19 by way of line 22 at a temperature of −1° F. and a pressure of 29.7 p.s.i.a. are 5230 pounds per hour of ammonia.

Withdrawn as bottoms from absorber 19 by way of line 23 at a temperature of 275° F. maintained by reboiler 23a is a stream composed of 27,300 pounds per hour of monoethanolamine, 4620 pounds per hour of carbon dioxide, 1640 pounds per hour of water. The stream of line 23 is passed through the exchanger 24 wherein its temperature is raised to 310° F. and then it is introduced by way of line 25 into the upper portion of desorber 26. Overhead from desorber 26 are withdrawn by way of line 27 at a temperature of 200° F. and a pressure of 14.7 p.s.i.a. 4520 pounds per hour of carbon dioxide and 1510 pounds per hour of water. Withdrawn as bottoms from desorber 26 by means of line 28 and passed to exchanger 24 is a stream at a temperature of 350° F. composed of 27,300 pounds per hour of monoethanolamine, 130 pounds per hour of water and 100 pounds per hour of carbon dioxide. The temperature of the stream of line 28 is reduced by exchanger 24 to 310° F. and the stream of line 28 is then passed by way of line 29 to exchanger 30 wherein its temperature is further reduced to 110° F., and from whence it is passed by way of line 15 to absorber 14.

The carbon dioxide and water stream of line 27 can either be sent to disposal or passed to process for the separation of carbon dioxide and water (not shown) and the carbon dioxide recycled to the urea synthesis unit.

The high pressure ammonia vapor in line 17 from absorber 14 is passed to condenser 31 in indirect heat exchange with cooling water where it is liquefied. Low pressure ammonia vapor in line 22 from absorber 19 is combined with liquid ammonia from line 42 and is passed to line 44 from which an admixture of ammonia liquid and vapor passes into subcooler 43. Ammonia vapor which leaves subcooler 43 by way of line 47 combines with ammonia vapor vented from condenser 31 by way of line 32 and the combined stream passes by way of line 33 to compressor 34. The compressed ammonia vapor is passed to condenser 31 where it is liquefied. Liquid ammonia leaves condenser 31 by way of line 36 to receiver 37. Liquid ammonia leaves receiver 37 by way of line 38 which discharges into lines 39 and 40. Line 39 discharges into line 16, which passes liquid ammonia to the top of absorber 14, and into line 48 which returns 14,060 pounds per hour of liquid ammonia to the urea-synthesis unit. Make-up ammonia is provided through line 49.

The stream of liquid ammonia passing through line 40 is discharged into lines 41 and 42. Line 41 carries the liquid ammonia through subcooler 43 and thence by way of line 21 to absorber 19. The liquid ammonia which passes by way of lines 42 and 44 into subcooler 43 flash vaporizes thus subcooling the liquid ammonia passing through the subcooler by way of line 41. Liquid level controller 45 maintains the level of liquid ammonia in subcooler 43 at a predetermined level by returning excess liquid to line 40 by way of line 46.

We claim:

1. A method for the separation of gaseous ammonia at a pressure of about 70 p.s.i.a. to about 280 p.s.i.a. at which pressure ammonia is condensable with cooling water, from a gaseous mixture of ammonia and carbon dioxide wherein the molar ratio of ammonia to carbon dioxide is at least 1:1 which comprises contacting said gaseous mixture consisting essentially of ammonia and carbon dioxide with liquid monoethanolamine of at least 50% by weight monoethanolamine concentration in a first contact stage at a pressure within the range from about 70 p.s.i.a. to about 280 p.s.i.a. wherein all the carbon dioxide of said gaseous mixture is absorbed by said liquid monoethanolamine, introducing sufficient liquid ammonia into the first contact stage to maintain the bottoms monoethanolamine temperature in the first contact stage within the range of about 220° to 320° F., and the ammonia concentration in the bottoms effluent from the first contact stage within the range of approximately 3 to 20% by weight, removing unabsorbed ammonia gas from the first contact stage, removing the monoethanolamine enriched with carbon dioxide and ammonia from the first contact stage, passing said enriched monoethanolamine to a second contact stage maintained at a pressure within the range of about 15 to about 50 p.s.i.a. wherein ammonia is desorbed from the enriched monoethanolamine, removing ammonia gas from the second contact stage, removing the monoethanolamine enriched with carbon dioxide from the second contact stage and passing it to a third stage and therein heating it whereby the absorbed carbon dioxide is liberated, withdrawing carbon dioxide gas from the third stage and withdrawing liquid monoethanolamine substantially free of dissolved ammonia and carbon dioxide from the third stage.

2. The method of claim 1 wherein the molar ratio of ammonia to carbon dioxide in the gaseous mixture is from about 95:1 to about 1:1.

3. The method of claim 1 wherein the molar ratio of ammonia to carbon dioxide in the gaseous mixture is from about 20:1 to about 2:1.

4. The method of claim 1 wherein the gaseous mixture consists essentially of ammonia and carbon dioxide in a molar ratio of from about 95:1 to about 1:1 respectively, and water vapor up to saturation.

5. The method of claim 1 wherein the gaseous mixture consists essentially of ammonia and carbon dioxide in a molar ratio of from about 20:1 to 2:1 respectively, and water vapor up to saturation.

6. The method of claim 5 wherein the molar ratio of water to the total moles of ammonia and carbon dioxide in the gaseous mixture is up to about 0.25:1.

7. A method for the separation of gaseous ammonia at a pressure of about 70 p.s.i.a. to about 280 p.s.i.a. at which pressure ammonia is condensable with cooling water, from a gaseous mixture of ammonia and carbon dioxide wherein the molar ratio of ammonia to carbon dioxide is at least 1:1 which comprises contacting a first stream of said gaseous mixture consisting essentially of ammonia and carbon dioxide with liquid monoethanolamine of at least 50% by weight monoethanolamine concentration in a first contact stage at a pressure within the range from about 70 p.s.i.a. to about 280 p.s.i.a. wherein all the carbon dioxide of said gaseous mixture is absorbed by said liquid monoethanolamine, introducing sufficient liquid ammonia into the first contact stage to maintain the bottoms monoethanolamine temperature in the first contact stage within the range of about 220° to 320° F. and the ammonia concentration in the bottoms effluent from the first contact stage within the range of approximately 3–20% by weight, removing unabsorbed ammonia gas from the first contact stage, removing the monoethanolamine enriched with carbon dioxide and ammonia from the first contact stage, contacting said enriched monoethanolamine with a second stream of a gaseous mixture consisting essentially of ammonia and carbon dioxide in a second contact stage maintained at a pressure within the range of about 15 to about 50 p.s.i.a. wherein all the carbon dioxide is absorbed from the gaseous mixture and ammonia is desorbed from the enriched monoethanolamine, removing the ammonia gas from the second contact stage, removing the monoethanolamine enriched with carbon dioxide from the second contact stage and passing it to a third stage and therein heating it whereby the absorbed carbon dioxide is liberated, withdrawing carbon dioxide gas from the third stage and withdrawing liquid monoethanolamine substantially free of dissolved ammonia and carbon dioxide from the third stage.

8. The method of claim 7 wherein the molar ratio of ammonia to carbon dioxide in the first stream is from about 20:1 to about 2:1 and wherein the molar ratio of ammonia to carbon dioxide in the second stream is from about 20:1 to about 1:1.

9. The method of claim 7 wherein the gaseous mixtures consist essentially of ammonia and carbon dioxide in a molar ratio of from about 95:1 to about 1:1, respectively, and water vapor up to saturation.

10. The method of claim 7 wherein the first stream consists essentially of ammonia and carbon dioxide in a molar ratio of from about 20:1 to about 2:1 respectively, and water vapor up to saturation and wherein the second stream consists essentially of ammonia and carbon dioxide in a molar ratio of from about 20:1 to about 1:1, respectively, and water vapor up to saturation.

11. The method of claim 10 wherein the molar ratio of water to the total moles of ammonia and carbon dioxide in the first stream is up to about 0.25:1, and wherein the molar ratio of water to the total moles of ammonia and carbon dioxide in the second stream is up to about 2:1.

12. The method of claim 7 wherein the weight ratio of the first stream to the second stream is from about 30:1 to about 3:1.

13. A method for the preparation of urea which comprises introducing ammonia and carbon dioxide in a molar ratio of at least 2:1 into a urea synthesis zone maintained at elevated conditions of temperature and pressure whereby a product stream containing urea, water vapor, ammonia and carbon dioxide is produced, separating from the product stream a first gaseous mixture having a pressure within the range from about 70 p.s.i.a. to about 280 p.s.i.a. and consisting essentially of ammonia, carbon dioxide and water vapor, the molar ratio of ammonia to carbon dioxide being within the range of from about 20:1 to about 2:1 and the amount of water vapor being up to the limit of saturation; separating from the product stream a second gaseous mixture having a pressure within the range from about 15 p.s.i.a. to about 50 p.s.i.a. and consisting essentially of ammonia, carbon dioxide and water vapor, the molar ratio of ammonia to carbon dioxide being within the range from about 10:1 to about 1:1 and the amount of water vapor being up to the limit of saturation; contacting the first gaseous mixture with liquid monoethanolamine of at least 50% by weight monoethanolamine concentration in a first contact stage maintained at a pressure within the range of 70 p.s.i.a to 280 p.s.i.a. wherein all the carbon dioxide and water of said gaseous mixture are absorbed by said liquid monoethanolamine, introducing sufficient liquid ammonia into the first contact stage to maintain the bottoms monoethanolamine temperature in the first contact stage within the range of about 220° to 320° F. and the ammonia concentration in the bottoms effluent from the first contact stage within the range of approximately 3–20% by weight, removing unabsorbed ammonia gas from the first contact stage a pressure of about 70 p.s.i.a. to about 280 p.s.i.a. at which pressure ammonia is condensable with cooling water, removing the monoethanolamine enriched with carbon dioxide, water and ammonia from the first contact stage, contacting said enriched monoethanolamine with the second gaseous mixture in a second contact stage maintained at a pressure within the range of 15 p.s.i.a. to 50 p.s.i.a. wherein all the carbon dioxide and water are absorbed from the gaseous mixture and ammonia is desorbed from the enriched monoethanolamine, removing ammonia gas from the second contact stage, removing the monoethanolamine enriched with carbon dioxide and water from the second contact stage and passing it to a third stage and therein heating it whereby absorbed carbon dioxide and water vapor are liberated, withdrawing carbon dioxide gas and water vapor from the third stage, withdrawing liquid monoethanolamine substantially free of ammonia and carbon dioxide from the third stage, passing the carbon dioxide gas and water vapor withdrawn from the third stage to a carbon dioxide separation stage wherein the carbon dioxide gas is separated from the water vapor, removing carbon dioxide from the separation stage and returning it to the urea synthesis zone, liquefying the ammonia removed from the first contact stage and the second contact stage, and returning the liquid ammonia to the urea synthesis zone.

14. The method of claim 13 wherein the weight ratio of the first stream to the second stream is from about 30:1 to about 3:1.

References Cited in the file of this patent

UNITED STATES PATENTS 2,785,045     Shen Wu Wan et al. _____ Mar. 12, 1957

OTHER REFERENCES

Cook, "Urea," Chemical Engineering Progress, vol. 50, No. 7, July 1954, pp. 327–331.